United States Patent Office 3,015,604
Patented Jan. 2, 1962

3,015,604
POROUS POLYTETRAFLUOROETHYLENE ARTICLE CONTAINING GLASS MICROBALLOONS
Jerome Hochberg, Newburgh, N.Y., assignor to E. I. du Pont de Nemours and Company, Wilmington, Del., a corporation of Delaware
No Drawing. Filed May 2, 1957, Ser. No. 656,511
1 Claim. (Cl. 162—157)

This invention relates to a felt-like product and more particularly to a felt-like sheet comprising a mixture of fibrous polytetrafluoroethylene and small particles of a heat-resistant material and to articles made therefrom.

Polytetrafluoroethylene has many outstanding properties such as electrical, chemical and heat resistance. Recently, paper-like sheets of polytetrafluoroethylene have been made; however, such paper-like sheets shrink when they are held at high temperatures, and, for many purposes, lack adequate porosity. Furthermore, it is difficult to make such paper-like products very thick. Felts of polytetrafluoroethylene also lack dimensional stability at high temperatures, and are more expensive to make than paper-like products.

I have discovered a felt-like product of fibrous polytetrafluoroethylene which can be made economically and which has excellent dimensional stability at elevated temperatures and high porosity. The product of this invention is a felt-like sheet comprising a mixture of at least about 10% by weight of fibrous polytetrafluoroethylene having a fiber length of less than about 1.0 inch and up to 90% by weight of particles of a heat resistant material having an average diameter of about from 25 to 500 microns. Preferably, the felt-like product contains about from 25 to 75% by weight of fibrous polytetrafluoroethylene having a fiber length of less than about 0.25 inch and about from 75 to 25% by weight of heat-resistant particles having an average diameter of about from 100 to 350 microns.

The felt-like product of this invention is prepared by dispersing the fibrous polytetrafluoroethylene and the heat-resistant particles in a liquid medium, filtering the dispersed material from the fluid medium thereby forming a wet mat, drying the resulting product and heating the dried felt-like product to partially fuse the fibrous polytetrafluoroethylene and strengthen the sheet.

Any fibrous polytetrafluoroethylene having a fiber length of less than about 1.0 inch and preferably less than about 0.25 inch can be used in the products of this invention. Fibrous polytetrafluoroethylenes of this size can be formed into coherent sheets by conventional papermaking techniques.

One preferred method of preparing the fibrous material is to extrude lubricated colloidal particles of polytetrafluoroethylene, then work the resulting extruded material to form fibers which can be pulped, that is, dispersed in water or some other liquid medium. First a suspension or paste of polytetrafluoroethylene is extruded in the form of a filament, rod or tube which is, for example ⅟₁₆ to ⅛ inch in diameter. During this operation, fibers form in the extruded article. The extruded polytetrafluoroethylene is then cut into small lengths of, for example, 0.25 to 1 inch, and worked in a "micropulverizer" hammer mill, shredder or similar device to break up extruded material into individual fibers. Preferably coarse fibers are recycled to produce fibers more suitable for pulping.

The preferred process for producing the fibrous polytetrafluoroethylene described above is explained in more detail in co-pending application Serial No. 426,041 filed on April 27, 1954, and now abandoned, by Edward F. Harford.

Any particulate material which has a particle diameter of about 25 to 500 microns, and preferably 100 to 350 microns and which will withstand temperatures without deterioration at least as high as those polytetrafluoroethylenes will withstand, can be mixed with the fibrous polytetrafluoroethylene. Such materials include, for example, glass beads, diatomaceous earth, and ground glass, rock, and metal. Silicious materials, particularly glass microballoons, are preferred because of their outstanding chemical inertness, low cost, and electrical and heat insulating properties. If the fibrous polytetrafluoroethylene in such products is destroyed at excessively high temperatures, a layer of insulating silicious material still remains.

Glass microballoons, which are small unicellular glass spheres, yield products which, in addition to the aforementioned chemical, electrical and high temperature properties, have low density and high porosity.

The fibrous polytetrafluoroethylene and the heat resistant particles are dispersed in a liquid medium with a Waring blendor or similar mixing apparatus. Water is a convenient medium, however, other inert liquid media can be used if desired. The concentration of solids in the dispersion is not critical; usually, however, concentrations of about from 0.25 to 10% are used.

Preferably about from 0.2 to 1% by weight of wetting agent and about from 0.1 to 0.3% by weight of a thickener based on the polytetrafluoroethylene are added to the dispersion. Suitable wetting agents include, for example, octyl phenyl polyglycol ether, sodium lauryl sulfate and polyoxyethylene and polyoxypropylene. Examples of thickening agents are carboxymethyl cellulose, the sodium salt of carboxymethyl cellulose, polyvinyl alcohol, and sodium, potassium and ammonium alginates and polyacrylates. Antifoamants such as ethyl acetate can also be added in conventional amounts.

The dispersion of polytetrafluoroethylene and heat-resistant particles can be formed into a wet mat on any of the conventional papermaking machines, such as, for example, Fourdrinier machines, continuous rotary papermaking machines or simple vacuum filters equipped with fabric, wool-felt or wire-screen filter septum. Shaped articles such as cylinders and cups can be made by filtering the dispersion through a screen mold of the appropriate configuration, then processing the shaped sheet as described hereinafter.

Preferably the wet mat is pressed to remove excess water and to smooth the sheet. One convenient method of pressing is to place the wet mat between two sheets of absorbent paper or felt, then run the layup between two rubber rolls set to press the mat about from 0 to 5 pounds per linear inch. Alternatively, the wet mat can be dried without pressing. The mat can be, for example, air dried at room temperature or force dried in an oven at about 100 to 250° F.

After the mat is dried, it is heated to a temperature ranging from the fusion point of polytetrafluoroethylene (about 621° F.) to about 800° F., and preferably to about from 650 to 750° F. This partially fuses the fibers of polytetrafluoroethylene at their intersections and strengthens the sheet. The length of time which the sheet is held at the elevated temperature is not critical and depends to a great extent upon the thickness of the product; usually, about from 5 to 15 minutes is sufficient.

The felt-like products of this invention can be used for example, as gaskets, filters for corrosive liquid chemicals and for heat and electrical insulation. Articles made therewith have excellent dimensional stability, and resistance to high temperatures and corrosive chemicals. By changing the proportion of heat-resistant particles in the product, the properties of the final product can be varied to meet each particular need. As the percentage of heat-resistant particles is increased, the dimensional stability and porosity of the felt-like product increase and the strength and, with some types of particles such as glass microballoons and diatomaceous earth, density decrease.

Reinforced felt-like sheets can be prepared by depositing the wet mat on an open-mesh steel or glass fabric which is laid on top of the filter used to form the wet mat. After a wet mat has been formed on the fabric, the mat and adhered fabric are turned over and a second mat is deposited on the other side. The resulting product is pressed, dried and fused to yield a sheet in which is imbedded a heat-resistant reinforcing structure.

The products of this invention can be impregnated with polytetrafluoroethylene to yield articles which are particularly suitable for gaskets, pipes, cups, washers and embossed plates such as printing mats. One preferred method of preparing such articles is to first treat the felt-like sheets with one of the aforementioned wetting agents such as octyl phenyl polyglycol ether, then dip the resulting treated material into an aqueous dispersion of polytetrafluoroethylene particles. Next, the sheet is dipped in cold alcohol to coagulate the particles of polytetrafluoroethylene. The impregnation is completed by pressing the sheet under a pressure of about from 10 to 500 p.s.i. Finally, the product is dried, then heated at a temperature ranging from the fusing point of polytetrafluoroethylene to about 800° F. and preferably from 650 to 750° F.

The following examples are intended to illustrate the invention and not to limit it in any way. Parts are by weight unless otherwise specified.

*Example I*

Four dispersions were prepared by agitating mixtures of the following materials:

| | Parts | | | |
|---|---|---|---|---|
| | A | B | C | Control |
| Fibrous polytetrafluoroethylene | 1.89 | 1.88 | 1.79 | 1.89 |
| Glass microballoons | 1.84 | 2.61 | 3.44 | |
| Carboxymethyl cellulose—thickener | 0.005 | 0.005 | 0.005 | 0.25 |
| Octyl phenyl polyglycol ether-wetting agent and dispersing agent (Reaction product of 12 to 13 moles of ethylene oxide with one mole of octyl phenol) | 0.007 | 0.007 | 0.007 | 0.01 |
| Ethyl acetate—antifoamant | 0.47 | 0.47 | 0.43 | 0.47 |
| Water | 95.79 | 95.03 | 94.33 | 97.38 |
| | 100.00 | 100.00 | 100.00 | 100.00 |

The fibrous polytetrafluoroethylene used in the dispersions was prepared by milling extruded 1/16 inch polytetrafluoroethylene beading as described hereinbefore. The resulting fine fibers had a length of less than about 0.25 inch. The glass microballoons were unicellular spherical particles having a diameter of about from 40 to 150 microns.

Each of the preceding dispersions was run onto a filter thereby forming a wet mat. The wet mats were pressed lightly to remove excess water and dried in an oven at 100° F. Finally, each of the dried sheets was placed in an oven, heated to 690° F. over a period of about 90 minutes and held at 690° F. for 10 minutes. The resulting products containing glass microballoons were soft, flexible, and porous; they were useful for filtering corrosive liquids and for insulation. The control had the same weight of polytetrafluoroethylene per unit area as sample A.

The following table shows qualitative and quantitative comparisons of the products of this example. The numbers after each of the qualitative properties refer to the rank of the particular sample, e.g., sample C, is most porous and the control, the least porous.

| | Parts | | | |
|---|---|---|---|---|
| | A | B | C | Control |
| Percent by weight of polytetrafluoroethylene | 51 | 42 | 34 | 100 |
| Thickness, mils | 175 | >175 | >175 | 40 |
| Heat Shrinkage during processing, percent area | 5 | <5 | <5 | 40 |
| Porosity | 3 | 2 | 1 | 4 |
| Density | 2 | 3 | 4 | 1 |
| Flexibility | 3 | 2 | 1 | 4 |

The control and sample A were each held in the flame of a Bunsen burner. The control charred and shrank about 75% in area while sample A shrank only about 10% in area.

*Example II*

A reinforced felt-like sheet was prepared by a procedure and from a dispersion similar to that used for sample C of Example I.

A 4 x 4 count non-woven glass scrim was laid on top of a vacuum filter, then a wet mat was formed on top of the scrim. Next, the scrim and mat were turned over and a second layer of wet mat was deposited on the other side of the scrim. Finally, the product was dried and heated as described in Example I. The resulting product had a density, porosity and heat resistance similar to that of sample C, but had a much higher tensile strength than sample C.

*Example III*

A felt-like sheet similar to sample B in Example I was dipped in a 1% toluene solution of the octyl phenyl polyglycol ether wetting agent. After the treated felt-like sheet had been dried at 250° F., it was dipped in a dispersion containing 60 parts of polytetrafluoroethylene molding powder, 3.6 parts of octyl phenyl polyglycol ether wetting agent and 364 parts of water, then dipped in alcohol held at −60° F. The resulting product was dried for 3 hours at 400° F. and cold pressed under a pressure of 600 p.s.i. Finally, the product was heated at 700° F. for ½ hour.

The resulting felt-like product contained about 62% by weight of polytetrafluoroethylene impregnant. It was a rigid impervious material suitable for chemically resistant tank linings and printed circuits.

*Example IV*

A pipe of polytetrafluoroethylene was prepared from a dispersion similar to that used for sample B of Example I. The dispersion was forced into a 2-inch cylinder of 100-mesh wire screen until about a ⅛-inch mat was built upon the inner wall of the cylinder. The wet cylinder was dried and partially fused as described in the preceding examples, then the screen was peeled off the product. Finally, the resulting felt-like tube was put on a mandrel, impregnated with polytetrafluoroethylene, and heated as described in Example III. The resulting pipe was suitable for carrying corrosive chemicals at elevated temperatures.

By the process of this example and the preceding example, it is possible to make shaped articles of polytetrafluoroethylene which are thick and impervious economically and with little waste.

*Example V*

Example III was repeated; however, before the impregnated sheet was heated, it was cold pressed at about 1000 p.s.i. in a press equipped with embossed platens. Next, the embossed sheet was heated at 700° F. for 30 minutes. The resulting product had excellent detail and was suitable for a printing mat. After being held at 700° F. for 5 hours, the embossed product shrank less than about 4% and showed no loss in detail.

Example VI

A felt-like sheet was prepared by the procedure shown in Example I. Fibrous polytetrafluoroethylene similar to that used in Example I and glass microballoons having diameters ranging from about 50 to 350 microns were used in a weight ratio of about 1:2.65. The resulting product, because it contained a higher percentage of glass (73%) was less dense, had better thermal stability and was slightly weaker than the products of the preceding examples.

Example VII

Three felt-like sheets were prepared by the procedure and from the fibrous polytetrafluoroethylene shown in Example I. Coarse-grade diatomaceous earth having an average particle diameter of about 36 microns was used as the heat-resistant particulate material. The samples contained 38%, 65% and 76% by weight of diatomaceous earth respectively. The products of this example were stronger but slightly more dense than sheets formed with an equal weight percent of glass microballoons.

I claim:

A porous felt-like article comprising an intimate mixture of about from 25 to 75% by weight of polytetrafluoroethylene fibers having a fiber length of less than about 0.25 inch and about from 75 to 25% by weight of glass microballoons having an average diameter of about from 25 to 500 microns, said fibers being partially fused at their fiber intersections.

References Cited in the file of this patent

UNITED STATES PATENTS

| | | |
|---|---|---|
| 1,861,044 | Ballard | May 31, 1932 |
| 2,076,636 | Hanley | Apr. 13, 1937 |
| 2,520,173 | Sanders | Aug. 29, 1950 |
| 2,644,802 | Lontz | July 7, 1953 |
| 2,676,892 | McLaughlin | Apr. 27, 1954 |
| 2,685,707 | Llewellyn | Aug. 10, 1954 |
| 2,712,509 | Biefeld | July 5, 1955 |
| 2,717,220 | Fay | Sept. 6, 1955 |
| 2,721,139 | Arledter | Oct. 18, 1955 |
| 2,728,698 | Rudner | Dec. 27, 1955 |
| 2,804,678 | Rockoff | Sept. 3, 1957 |

FOREIGN PATENTS

| | | |
|---|---|---|
| 454,001 | Canada | Jan. 11, 1949 |